United States Patent [19]

Ukon et al.

[11] Patent Number: 5,241,362
[45] Date of Patent: Aug. 31, 1993

[54] MICROSCOPIC SPECTROMETER WITH AUXILIARY IMAGING SYSTEM

[75] Inventors: Juichiro Ukon, Ibaraki; Yasushi Nakata, Osaka, both of Japan

[73] Assignee: Horiba Ltd., Kyoto, Japan

[21] Appl. No.: 813,474

[22] Filed: Dec. 26, 1991

[30] Foreign Application Priority Data

Dec. 30, 1990 [JP] Japan ................ 2-416957

[51] Int. Cl.⁵ .................. G01J 3/10; G01J 3/04
[52] U.S. Cl. .................................... 356/326
[58] Field of Search ..................... 356/326, 328

[56] References Cited

U.S. PATENT DOCUMENTS

| | | | |
|---|---|---|---|
| 3,421,806 | 1/1969 | Weber | 356/432 |
| 3,718,400 | 2/1973 | Yonekubo | 356/73 |
| 3,740,147 | 6/1973 | Kallet | 356/328 |
| 3,887,283 | 6/1975 | Merstallinger | 356/219 |
| 4,674,883 | 6/1987 | Baurschmidt | 356/381 |
| 4,844,617 | 7/1989 | Kelderman et al. | 356/328 |

FOREIGN PATENT DOCUMENTS

| | | |
|---|---|---|
| 426040A1 | 5/1991 | European Pat. Off. . |
| 139234 | 6/1988 | Japan .................. 356/326 |
| 9007723 | 7/1990 | PCT Int'l Appl. . |
| 494950 | 9/1970 | Switzerland . |

Primary Examiner—F. L. Evans
Attorney, Agent, or Firm—Price, Gess & Ubell

[57] ABSTRACT

A microscopic spectrometer is disclosed wherein a sample can be irradiated with light from a first light source and either transmitted or reflected through the sample to a spectrometrical measuring system. A half mirror can be detachably provided in the optical system to form two branched optical paths. A second light source can be positioned to irradiate the sample 2 with light through a masking system. The half mirror can transmit the image of the masking system to superimpose it upon the sample and a composite image can then be reflected from the half mirror onto a branched optical path to be observed by the operator. The operator can adjust the actual positions of the masks assembly, while, at the same time, see the entire field of view of the specimen to therefore define in an easy and convenient manner the portion of the specimen to be tested. The respective half mirror and second light source can then be removed prior to performing a spectrometric measurement.

4 Claims, 4 Drawing Sheets

MICROSCOPIC SPECTROMETER WITH AUXILIARY IMAGING SYSTEM

BACKGROUND OF THE INVENTION

1. Field of the Invention

A microscopic spectrometer capable of irradiating a sample with light and then the light reflected by or through the sample is spectrometrically measured and, more particularly, a microscopic spectrometer having an auxiliary imaging system for targeting a portion of the sample is provided.

2. Description of Related Art

Microscopic spectrometers have proved to be a valuable tool in determining the properties of samples irradiated with light. Referring to FIG. 3, a conventional microscopic spectrometer arrangement is disclosed. A sample 2 is irradiated with light from a light source 1, and the light, which has transmitted through the sample, is subsequently collected by an object lens 3, which is shown in a schematic form, to provide an enlarged image on an image surface 4. This image is focused through a relay lens 5, shown in a schematic form, so that it can be observed by means of an eye piece 6, also shown in schematic form. When it is desired to provide a spectrometric measurement, an optical path changing mirror is positioned between the image surface 4 and the relay lens 5 to reflect the light to a spectrometric measurement system 8. This system is capable of measuring a spectrum of transmitted light in a known manner and a display device can provide the output of this analysis.

It is frequently necessary to measure the spectrum of merely a portion A of the total sample 2, as shown in, for example, FIG. 4(a). As can be seen, however, the entire sample 2 is realized as an image of the object to be measured so that a mixture spectrum of the substances A, B, and C would be obtained. In order to solve this problem, the image surface 4 is provided with relatively movable masks 10 and 11, as shown, respectively, in FIGS. 3 and 4(b). One set of masks is moved in the X plane, while another set of masks can be moved in the Y plane to enable a rectangular slit or a square to be realized while shading beams of illumination from the specimen from the other areas of the target object. Generally, the respective masks 10 and 11, or shutters 10 and 11, are formed in the shape of a knife edge with their lens optionally changeable to shade, for example, light from substances B and C other than desired substance A, whereby the substance A can be measured with an appropriate adjustment of the slit length so that only light beams from the substance A will be received, as shown in FIGS. 4(b) and 4(c). While such a procedure is effective in providing the desired spectrum of light to be analyzed, it creates a significant problem in the conventional microscopic spectrometer, because the use of the masks also limits the field which can be observed through the masks 10 and 11, as shown in FIG. 4(c). Since the other substances B and C of the specimen are shaded or blocked from view, any positional relationship of the substance A to the entire image of the sample 2 cannot be observed. Additionally, the positional relationship of the object to be measured through the masks 10 and 11 will be considerably reduced. As can be appreciated, it is frequently necessary to understand the relationship of the measured portion relative to the entire image of the substance to be measured, such as, for example, in measuring a semiconductor chip, or the cellular tissue of a living body. As a result, it is frequently necessary for the technician to reconfigure the positional relationship of the object to be measured by moving the masks 10 and 11 or by enlarging or moving the slit between the masks. This creates an additional problem in that any secondary measurements to reconfirm an initial measurement will become extremely difficult, since the reproduced positions of the masks 10 and 11 and the exact slit length parameter and its relationship to the sample will be extremely difficult to reproduce, thereby reducing the accuracy and the confidence in the measurement procedure.

Thus, in the prior art there is still a demand to improve a microscopic spectrometer to ensure both the accuracy and ease of operation of the instrument.

SUMMARY OF THE INVENTION

An object of the present invention is provided an improved microscopic spectrometer that is relatively simple in construction and is further capable of easily confirming the accurate positioning of the portion of a sample to be measured without reconfiguring the components in the system.

The present invention can be achieved by providing a microscopic spectrometer in which a sample is irradiated with a light from a light source, such that the light is either reflected by the sample, or the light is transmitted through the sample, and then subsequently spectrometrically measured through an objective lens. In an optical system achieving this, a half mirror is detachably provided in the rear of the object lens to form two branched optical paths. A masking apparatus can be provided at the focus of the object lens in one branched optical path and a second light source for irradiating the sample with light through the masking apparatus can be detachably provided in the read of the masking apparatus or assembly. Thus, a synthetic image of a total image of the sample by beams from the first light source and an image of the mask slit by beams from the second light source may be observed at a focus of the object lens in the other optical branched path. Thereby, a technician can both realize the sampling area and its relationship with the total sample without requiring a reconfiguration of the masking apparatus or lenses during the measurement operation.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DESCRIPTION OF THE PREFERRED EMBODIMENTS

The following description is provided to enable any person skilled in the art to make and use the invention and sets forth the best modes contemplated in carrying out the invention. Various modifications, however, will remain readily apparent to those skilled in the art, since the generic principles of the present invention have been defined herein specifically to provide an economical and efficient microscopic spectrometer with an auxiliary imaging system.

Figure 1:
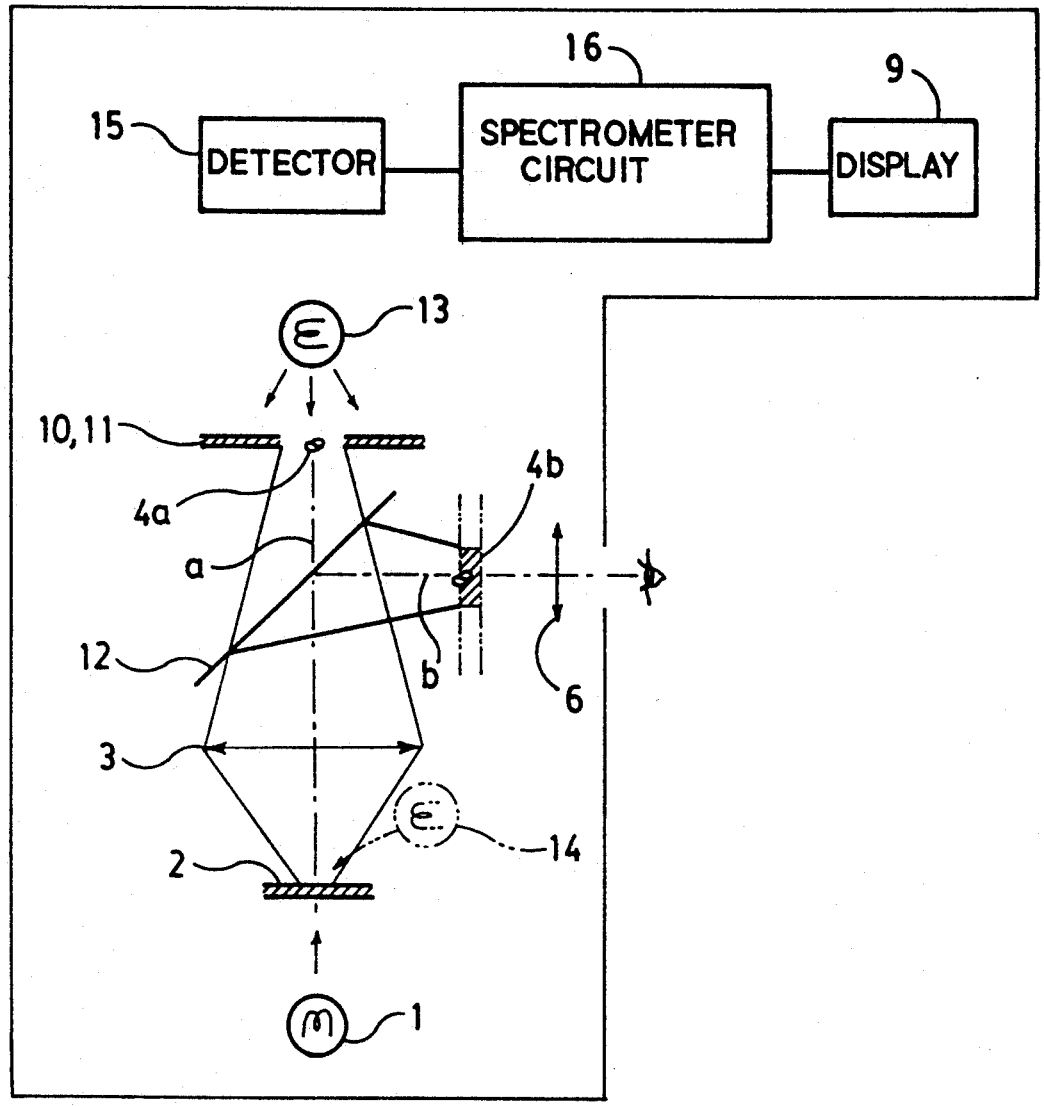
FIG. 1 is a schematic drawing showing the construction of the present invention wherein the entire field of view of the sample is observed by a microscopic spectrometer.

Referring to FIG. 1, a microscopic spectrometer according to the present invention discloses a sample, which is irradiated with light from a light source, and the light is either reflected from or transmitted through the sample, depending on the specific arrangement to subsequently spectrometrically measure the sample or specimen through an object lens. The light source 1 can transmit light through a specimen mounting station containing a specimen 2. Alternatively, a light source 14 can be utilized to irradiate the specimen 2 for a reflection of light. The light rays containing the spectrum of information can be focused by an objective lens 3, shown in a schematic configuration.

The light, for example, from the light source 1 can be visible light and objective lens 3 can collect light beams, which have either transmitted through the sample 2, or resulting beams, which occur from an excitation by incident light, such as fluorescence and phosphorescence. The object lens 3 is capable of focusing a large image of the sample 2 at the focus point 4a. A half mirror 12 is removably mounted in the rear of the object lens 3. The half mirror 12 can be of a conventional configuration and its optical coatings and angular arrangement in the optical path of the microscopic spectrometer is capable of transmitting light in one direction and reflecting light in the other direction, thereby creating a pair of branched optical paths (a), (b) on the downstream side of the half mirror. A masking assembly, having masks 10 and 11, is capable of forming, for example, a rectangular slit positioned adjacent the focusing point 4(a). These respective masks 10 and 11 can be formed in the shape of a knife edge and their length can be optionally changeable, thereby enabling the masking assembly to shade light beams other than those from the desired portion of the sample to be measured. As can be appreciated, other shading assemblies, such as a circular pinhole can be used as the shading means. An eye piece 6 is arranged in the optical path (b) which is branched by the half mirror 12, so that a second focus point 4(b) of the objective lens 3 can be achieved. The second light source 13 for irradiating the light sample 2 with light (visible light) through the masks 10 and 11 is detachably arranged in the rear of the masks 10 and 11 in the optical path A. A spectrometer measurement system for receiving the beams transmitted though the masks 10 and 11 from the sample 2 includes a detector 15 and a conventional spectrometer circuit 16. A display device 9 can be further arranged in the rear of this light source 13.

In operation, to determine the spectrometric measurement of a sample, the sample is appropriately located on the mounting station and the half mirror 12 and the second light source 13 are arranged in the optical path. The sample 2 is irradiated with light from the light source 1 so that the entire field of view of the sample 2 receives the irradiating beams to focus an image of the entire sample 2 into an image at the respective focus points 4a and 4b in the respective optical branched (a) and (b). The masking assembly, having masks 10 and 11, can then be subjectively arranged by the operator to define an appropriate portion of the entire field of view from which the spectrometric measurement is to be taken. Thus, the whole field of view at the focus point 4a will subsequently be restricted by the masks 10 and 11 so that only beams from the portion to be measured of the sample 10 will be transmitted along the optical axis of the optical path A through the masks 10 and 11. This light from light source 13 will be transmitted through the half mirror 12 to be superimposed over the sample 2. Since the positions of the masks 10 and 11 relative to the object lens 3 are conjugate at points of the sample surface, the beams incident upon the masks 10 and 11 from the second light source 13, which is being transmitted through the rear of a masks assembly, and then subsequently through the half mirror 12, form an image of the slit of a masks 10 and 11 onto the image of the same sample surface. The respective images of the slit of the masks 10 and 11 will be superimposed upon a portion of the image of the sample to be measured. As can also be appreciated, the images of the slit focused onto the image on the sample surface are also enlarged with the object lens 3 and are reflected by the half mirror 12 to be focused into a combined image at the focus point 4b in the optical path (b) relative to the image of the whole field of view.

As a result, a composite or synthetic image of an enlarged image of the entire field of view of the sample 2 by the beams from the first light source 1 and the image of the slit of the masks 10 and 11 by the beams from the second light source 13 will be collectively focused into an image at the focus point 4b in the optical branch path (b). As can be readily appreciated, an observer through the eye piece 6 viewing this composite or synthetic image simultaneously will see not only the entire field of view of the sample, but also will be able to observe that portion which is being shaded by the masks assembly on the sample 2. Thus, the observer can confirm the desired position of the portion to be measured in the entire field of view, while, at the same time, noting its relationship to the entire sample.

Figure 2:
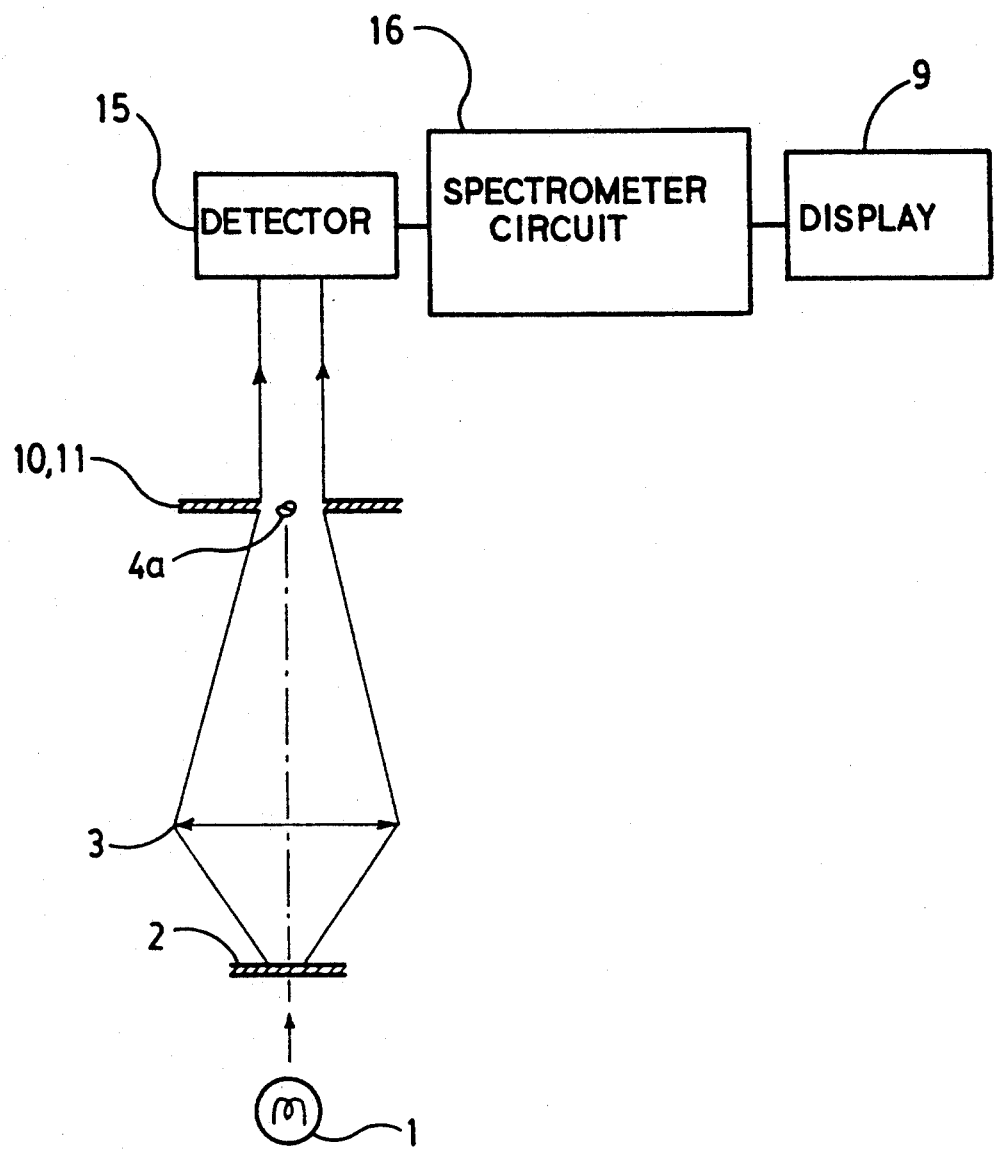
FIG. 2 is schematic drawing showing a construction of the present invention when the auxiliary light and half mirror are withdrawn to enable a spectrometric measurement to be carried out by the microscopic spectrometer.
Figure 3:
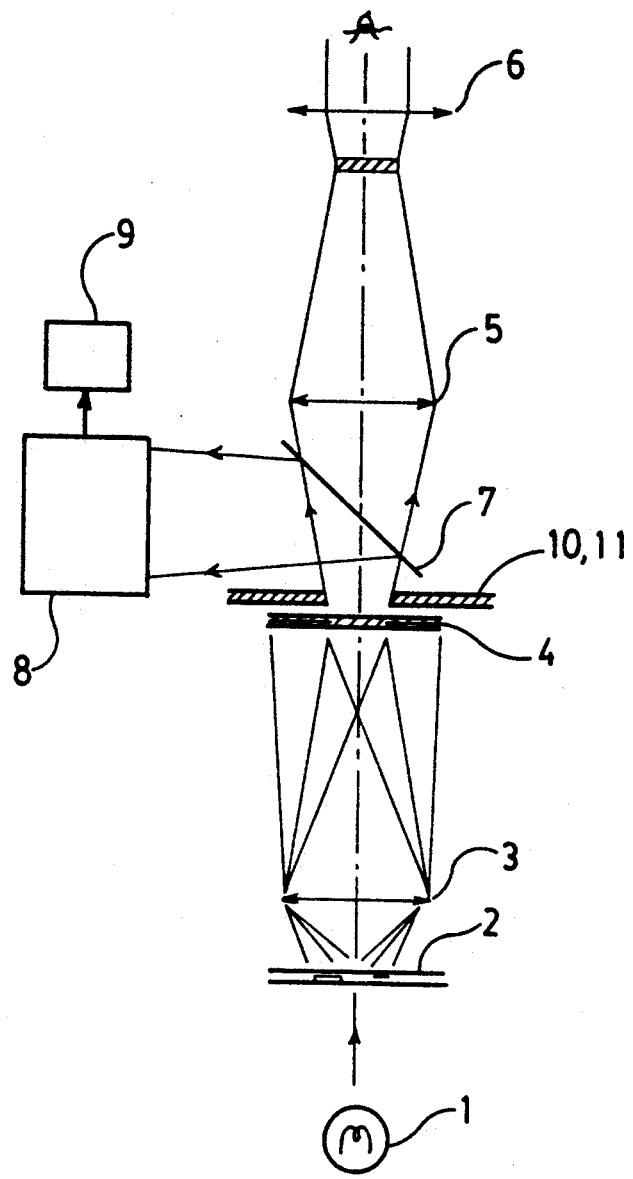
FIG. 3 is a schematic drawing of a construction of a conventional microscopic spectrometer.

Subsequently, the proper spectrometric measurement becomes possible by removing the half mirror 12 and the second light source 13 from the respective optical paths, after confirming the position of the sample portion to be measured. As a result, the optical path (b) is effectively removed from the system prior to the measurement and the light source 13 is also removed. The effective spectrometric measurement then occurs in a system as shown in FIG. 2.

Figure 4A:
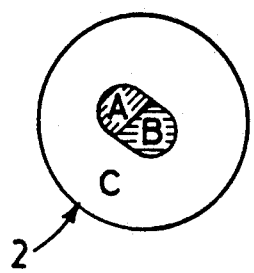
FIG. 4(a) is a schematic view showing an image of a sample.
Figure 4B:
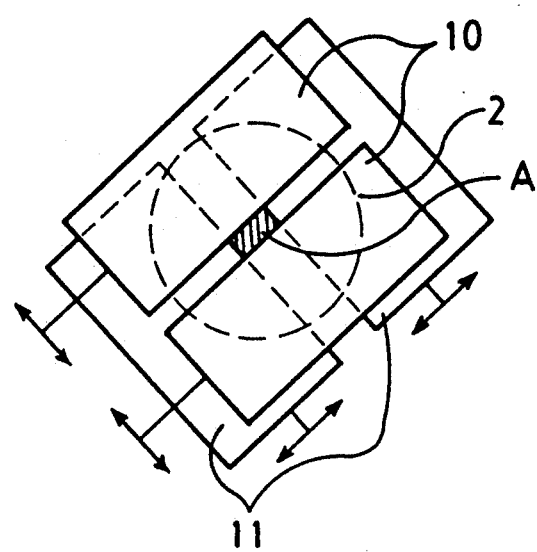
FIG. 4(b) is a schematic view showing the operation of the masking blades.
Figure 4C:
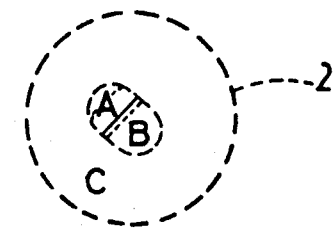
FIG. 4(c) is a schematic view showing the image and the relationship of the masking blades.

In this arrangement, the light from the first light source 1 is transmitted through the sample 2 and focused by the objective lens 3 to provide an enlarged view of the sample at the focus point 4a. The respective masks 10, 11 of the masking assembly have already been positioned at the desired arrangement, whereby only the desired portion of the sample 2 will be received by the detector 15 in the in the spectrometric measurement system. For example, the desired measurement portion, shown in FIG. 4(c), will be realized and the measurement can then proceed accordingly with the displayed results disclosed in a display 9.

An alternative embodiment of the present invention can also be realized by placing a light source 14 on the same side of the image surface 2 as the objective lens 3, but slight offset. This is schematically shown as the light source 14 in FIG. 1. The invention disclosed and described above with the light source 1 being utilized is a transmission type microscopic spectrometer with light passing through the sample. For those samples that will not pass light through, the reflective type of microscopic spectrometer arrangement utilizing the light source 14 can be used.

The above arrangement was disclosed wherein visible light was utilized to form an image that can be observed by the technician. It can be readily appreciated, however, that the light source could, for example, be infrared rays, ultraviolet rays, or other radiation, and that such other radiation sources could respectively replace the light sources 1 or 14 after the technician has aligned the masking blades 10 and 11 of the masking system. Thus, a measurement under infrared light source, ultraviolet light source, or other radiation can be achieved while still realizing the advantages of the present invention.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A microscopic spectrometer comprising:
   a housing;
   means in the housing for mounting a specimen;
   means for illuminating the specimen with radiation;
   means for focusing the illumination from the specimen to a predetermined position along a first optical path;
   sensor means for receiving the illumination from the specimen to provide spectral data on the specimen;
   masking means, in the first optical path, for limiting the illumination received from the specimen to that from a predetermined portion of the specimen, the masking means including a variable aperture mechanism for providing an aperture subjectively determined by an observer;
   a removable source of light positioned within the first optical path between the masking means and the sensor means, and
   a removable half mirror positioned in the first optical path, to provide a second optical path which transmits an image of the aperture onto the specimen and reflects a composite image of the specimen and aperture to the observer along the second optical path.

2. The invention of claim 1 wherein the means for illuminating a specimen with radiation includes a visible light source.

3. The invention of claim 1 wherein the removable light source is positioned on a rear side of the half mirror relative to the specimen.

4. A method of microscopic spectrometry of a sample comprising the steps of:
   fixedly supporting a sample;
   providing a spectrometric detector with a first optical path extending between the sample and the detector;
   varying a size of a masking aperture within the first optical path to define a target size image on the sample;
   illuminating the masking aperture with a first source of light within the visible spectrum to enable an operator to align the target size image of the masking aperture on the sample;
   viewing a composite image of the sample and the target size image of the masking aperture on the sample;
   illuminating the sample with a second source of light in a wavelength range beyond the visible spectrum so that the second source of light passes from the sample through the masking aperture to the spectrometric detector; and
   analyzing the light of the second source from the sample after it passes through the masking aperture to provide spectrometric data.

* * * * *